(12) United States Patent
Willis et al.

(10) Patent No.: US 8,186,056 B2
(45) Date of Patent: May 29, 2012

(54) TURBINE VANE RESTORATION SYSTEM

(75) Inventors: Robert S. Willis, Orlando, FL (US);
Scott P. Irwin, Hopewell Junction, NY (US); Stacy Fang, Little Falls, NJ (US); Thomas H. Milidantri, Jr., Goshen, NY (US); Adam J. Taetsch, Syracuse, NY (US); Martin C. Gosling, Burnstown (CA); Georg Bostanjoglo, Berlin (DE); Dan Shipman, Middletown, NY (US); Orville Morgan, Port Jervis, NY (US); Gerry Milidantri, Airmont, NY (US)

(73) Assignees: Siemens Energy, Inc., Orlando, FL (US); Chromalloy Gas Turbine Corporation, Orangeburg, NY (US)

( * ) Notice: Subject to any disclaimer, the term of this patent is extended or adjusted under 35 U.S.C. 154(b) by 1022 days.

(21) Appl. No.: 11/823,767

(22) Filed: Jun. 28, 2007

(65) Prior Publication Data
US 2009/0000102 A1 Jan. 1, 2009

(51) Int. Cl.
*B23P 6/00* (2006.01)
(52) U.S. Cl. ..................................... 29/889.1
(58) Field of Classification Search .................. 29/889.1
See application file for complete search history.

(56) References Cited

U.S. PATENT DOCUMENTS

| | | |
|---|---|---|
| 3,818,646 A | 6/1974 | Peterson |
| 4,527,410 A | 7/1985 | MacNitt, Jr. et al. |
| 4,589,175 A | 5/1986 | Arrigoni |
| 4,737,417 A | 4/1988 | Mushardt et al. |
| 5,106,010 A | 4/1992 | Stueber et al. |
| 5,758,416 A | 6/1998 | Reverman et al. |
| 5,897,801 A | 4/1999 | Smashey et al. |
| 6,139,412 A | 10/2000 | Dwyer |
| 6,287,182 B1 | 9/2001 | Dwyer |
| 6,494,677 B1 | 12/2002 | Grady |
| 6,568,077 B1 | 5/2003 | Hellemann et al. |
| 6,568,993 B1 | 5/2003 | Jones et al. |
| 6,629,368 B2 | 10/2003 | Schnell et al. |
| 6,673,169 B1 | 1/2004 | Peterson, Jr. et al. |
| 6,685,431 B2 | 2/2004 | Hiskes |
| 6,754,955 B1 | 6/2004 | Carl, Jr. et al. |
| 2003/0075587 A1 | 4/2003 | Smashey et al. |
| 2003/0088958 A1 | 5/2003 | Wah |
| 2003/0106215 A1 | 6/2003 | Heyward et al. |
| 2004/0118175 A1 | 6/2004 | Lawrence et al. |
| 2005/0106407 A1* | 5/2005 | Scarlin .......................... 428/615 |
| 2007/0084048 A1 | 4/2007 | Gosling et al. |

FOREIGN PATENT DOCUMENTS

EP 1310632 A1 5/2003

OTHER PUBLICATIONS

Niebel et al., Product Design and Process Engineering, McGraw-Hill, 1974, p. 106.*

* cited by examiner

*Primary Examiner* — David Bryant
*Assistant Examiner* — Moshe Wilensky

(57) ABSTRACT

A system and method for reconfiguring a turbine vane. In at least one embodiment, the system may be used to straighten an airfoil of a turbine vane segment to remove lean, twist, or racking, or any combination thereof. The airfoil may be straightened by fixing portions of the forward and aft hooks of the inner and outer shrouds of the turbine vane, restricting other portions of the forward and aft hooks of the inner and outer shrouds of the turbine vane to only move rotationally about a centerline of the inner or outer shrouds, and applying a load to various portions of the inner and outer shrouds and the airfoil to return the turbine vane to be within predetermined specifications.

9 Claims, 4 Drawing Sheets

TURBINE VANE RESTORATION SYSTEM

FIELD OF THE INVENTION

This invention is directed generally to turbine vanes, and more particularly to turbine vane restoration systems.

BACKGROUND

Airfoils of turbine vane segments often distort during use in a turbine engine in one or more of four ways. For instance, airfoils may lean, which is downstream deflection. Airfoils may twist, which is rotation of the inner shroud about a longitudinal axis extending between the inner and outer shrouds. Airfoils may also be subjected to racking, which is inner shroud circumferential rotation about an engine centerline relative to the outer housing. Airfoils may also droop, which occurs when down stream portions of the outer housing deflect into the gas path. Such distortion conditions negatively affect performance of the turbine engine and may severely affect the lifecycle of the airfoil and of the inner and outer shrouds.

Conventional systems exist for removing twist from airfoils. However, conventional systems are time consuming. For instance, twist may be removed from an airfoil using a furnace cycle; yet, a furnace cycle is very time consuming. In addition, restoring a damaged airfoil to satisfactory tolerances is very difficult using conventional systems. Thus, a need exists for a more efficient airfoil repair system.

SUMMARY OF THE INVENTION

This invention relates to a system for reconfiguring an airfoil of a turbine vane segment. In at least one embodiment, the system may be used to straighten an airfoil of a turbine vane. The system for reconfiguring a turbine vane may be used to straighten an airfoil of a turbine vane to remove lean, twist, or racking, or any combination thereof. The airfoil may be straightened by applying a force to various portions of the airfoil and by restricting various portions of the airfoil. The airfoil may be worked up to approximately two degrees without incurring surface microcracks and up to approximately four degrees before incurring cracks visible with liquid penetrant testing inspection such as florescent penetrant inspection (FPI).

The system may be formed from a fixture that may be any device capable of supporting the turbine vane segment. In one embodiment, the fixture may be configured to support one or more retention arms that may be configured to be attached to a base to limit movement of certain portions of the turbine vane when loaded. The retention arms may be configured to be attached to projections on an outer surface of an outer shroud and inner shroud of the turbine vane to position the turbine vane within the system. In particular, the turbine vane may be formed from the elongated airfoil having the inner shroud attached at one end the outer shroud attached at the other end. The inner shroud may include one or more forward inner hooks and one or more aft inner hooks extending from the inner shroud away from the elongated airfoil. The outer shroud may include one or more forward outer hooks and one or more aft outer hooks extending from the inner shroud away from the elongated airfoil. The retention arms may be configured to rigidly support the forward or aft inner hooks, or both, or the forward or aft outer hooks, or both. In at least one embodiment, the turbine vane may be a TLes VX 4.3A Vane formed from RENE 80 material. The system may also include a force application device, which may be, but is not limited to being, a hydraulic jack or other appropriate device. The force application device may be positioned in various positions to apply a desired load to the turbine vane.

The system may be used by loading a turbine vane into the fixture. A forward outer hook of the turbine vane may be attached to the fixture via a retention arm to substantially prevent movement of the forward outer hook. An aft outer hook of the turbine vane may be coupled to a rotational movement device that restricts the aft outer hook of the turbine vane such that the aft outer hook may only rotate about a centerline of the outer shroud. The inner shroud of the turbine vane may be positioned in contact with a force application device such that a force may be applied to the inner shroud. The force may be applied to the turbine vane while the turbine vane is at room temperature. In at least one embodiment, the force application device may be used to apply a force to the forward outer hook on the outer shroud to induce a twisting of the forward outer hook about the centerline of the outer shroud.

In another embodiment, a turbine vane may be loaded into a fixture. An aft outer hook of the turbine vane may be locked with one or more retention arms to substantially prevent movement of the aft outer hook. An forward outer hook of the turbine vane may be coupled to a rotational movement device that restricts the forward outer hook of the turbine vane such that the forward outer hook may only rotate about a centerline of the outer shroud. The inner shroud of the turbine vane may be positioned in contact with a force application device such that a force may be applied to the inner shroud. The force may be applied to the turbine vane while the turbine vane is at room temperature. In at least one embodiment, the force application device may be used to apply a force to the aft outer hook on the outer shroud to induce a twisting of the aft outer hook about the centerline of the outer shroud.

In another embodiment, a turbine vane may be loaded into a fixture. Forward and aft inner hooks of the inner shroud of the turbine vane may be locked to the fixture to substantially prevent movement of the forward and aft inner hooks of the inner shroud. The forward outer hook of the turbine vane may be fixed to prevent rotation or axial movement of the forward outer hook. An outer surface of the outer shroud may be in contact with a damper. A second damper may be in contact with a center region of the elongated airfoil to limit movement. A force may be applied to the aft outer hook with a force application device turbine vane. The force may be applied to the turbine vane while the turbine vane is at room temperature. Applying a force in this manner may correct a problem with droop in the inner shroud.

The turbine vane may be in a solution annealed state before being subjected to a load, such as having undergone about 1200 degrees Celsius for two hours, to achieve the greatest movement and to minimize cracking. An aging heat treatment may also be applied to the turbine vane after applying the force to the turbine vane. For instance, the turbine vane may also be subjected to stabilization annealing of temperatures of about 1,095 degrees Celsius for about four hours, followed by a first precipitation hardening stage including exposure of the turbine vane to temperatures of about 1080 degrees Celsius, and followed by a second precipitation hardening stage including exposure of the turbine vane 12 to temperatures of about 870 degrees Celsius for about 12 hours.

An advantage of this invention is that a turbine vane may be reconfigured to be within predetermine physical specifications without preheating the turbine airfoil.

These and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

DETAILED DESCRIPTION OF THE INVENTION

Figure 1:
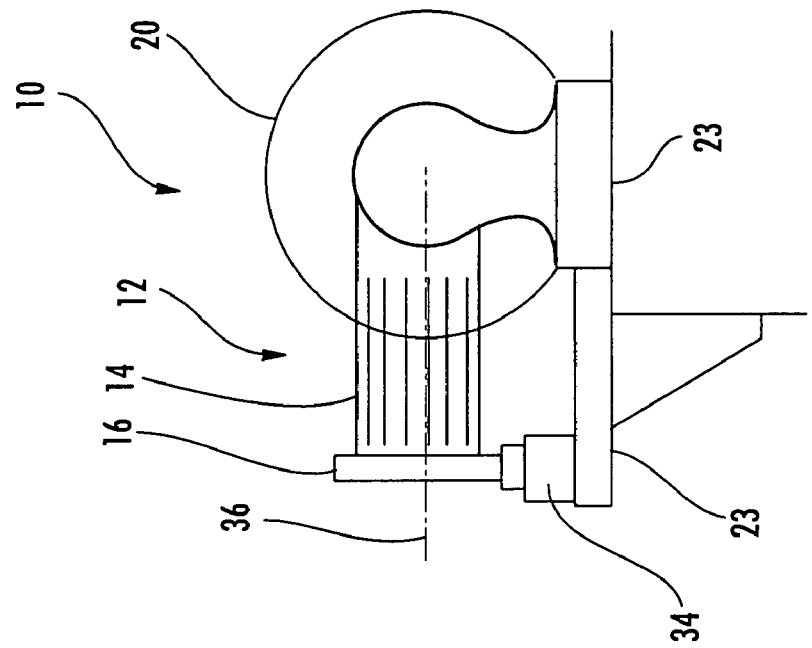
FIG. 1 is a front view of a fixture of the system of this invention.

As shown in FIGS. 1-5, this invention is directed to system 10 for reconfiguring a turbine vane segment 12. In at least one embodiment, the system 10 may be used to realign the turbine vane 12 by moving the outer shroud 18. The turbine vane 12 may be straightened by applying a force to various portions of the turbine vane 12 and by restricting various portions of the turbine vane 12. The turbine vane 12 may be worked up to approximately two degrees without incurring surface microcracks and up to approximately four degrees before incurring cracks visible with liquid penetrant testing inspection such as FPI.

As shown in FIGS. 1-4, the system 10 may be formed from a fixture 20 that may be any device capable of supporting the turbine vane segment 12. In one embodiment, the fixture 20 may be configured to support one or more retention arms 22. The retention arms 22 may be configured to be attached to a base 23 to limit movement of certain portions of the turbine vane 12 when loaded. The retention arms 22 may be configured to be attached to projections 24 on a surface 26 of an outer shroud 18 and inner shroud 16 of the turbine vane 12 to position the turbine vane 12 within the system 10. In particular, the turbine vane 12 may be formed from the elongated airfoil 14 having the inner shroud 16 attached at one end the outer shroud 18 attached at the other end. The inner shroud 16 may include one or more forward inner hooks 26 and one or more aft inner hooks 28 extending from the inner shroud 16 away from the elongated airfoil 14. The outer shroud 18 may include one or more forward outer hooks 30 and one or more aft outer hooks 32 extending from the outer shroud 18 away from the elongated airfoil 14. The retention arms 22 may be configured to rigidly support the forward or aft inner hooks 26, 28, or both, or the forward or aft outer hooks 30, 32, or both. In at least one embodiment, the turbine vane 12 may be a TLes VX 4.3A Vane formed from RENE 80 material.

Figure 2:
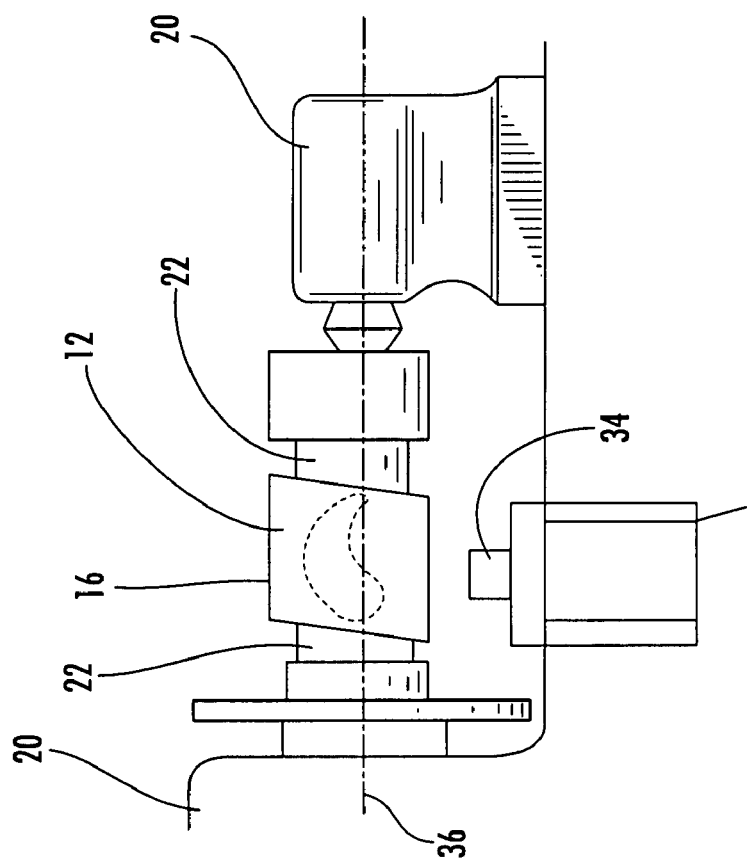
FIG. 2 is a left side view of the fixture of the system shown in FIG. 1.
Figure 3:
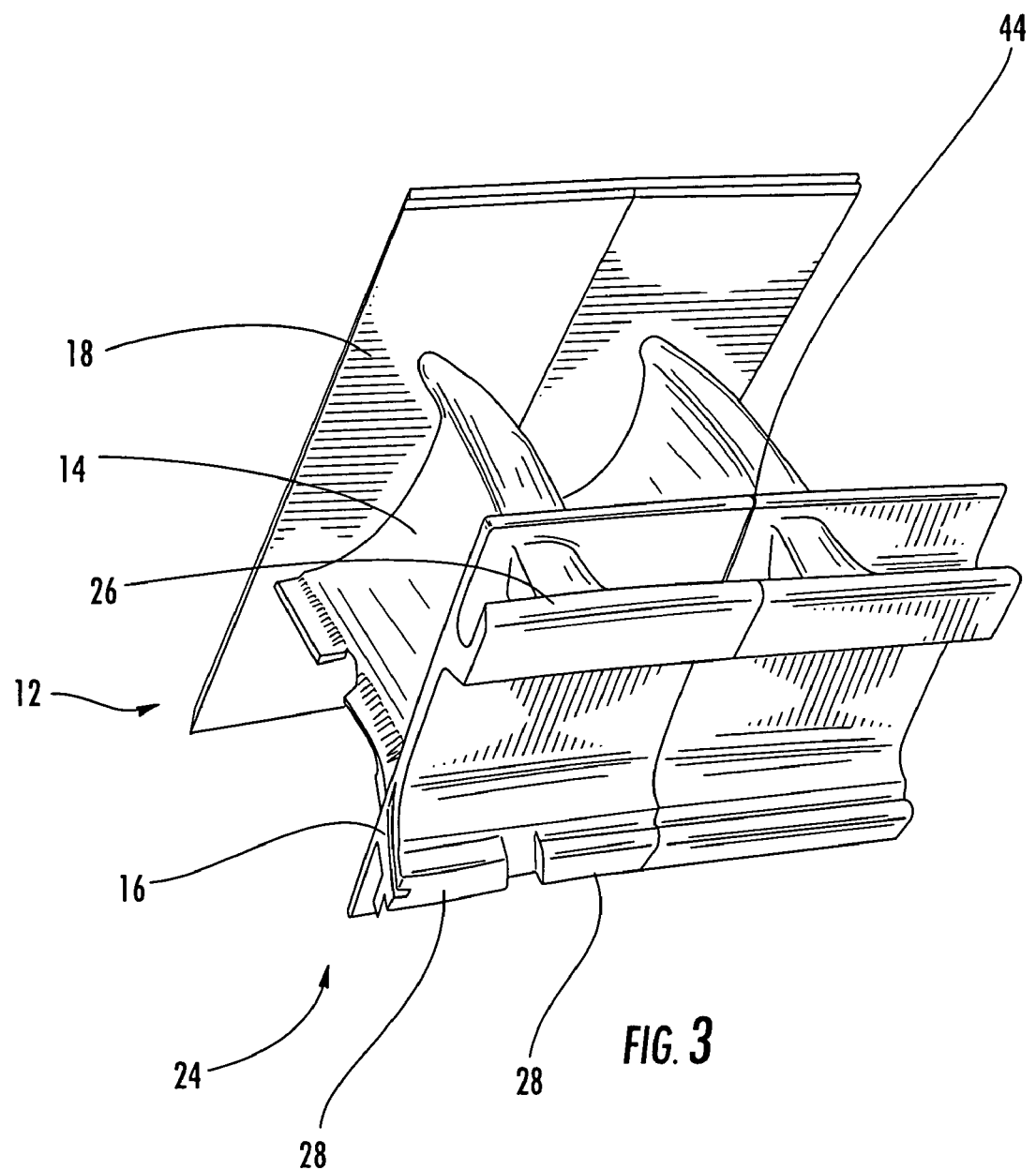
FIG. 3 is a perspective view of two turbine vanes positioned adjacent to each other in an inspection gauge such that an inner shroud gap is formed between the adjacent inner shrouds of the turbine airfoils.

As shown in FIGS. 1 and 2, loads may be applied to the turbine vane 12 with a force application device 34, which may be, but is not limited to being, a hydraulic jack or other appropriate device. The force application device 34 may be positioned in various positions to apply a desired load to the turbine vane 12.

Figure 4:
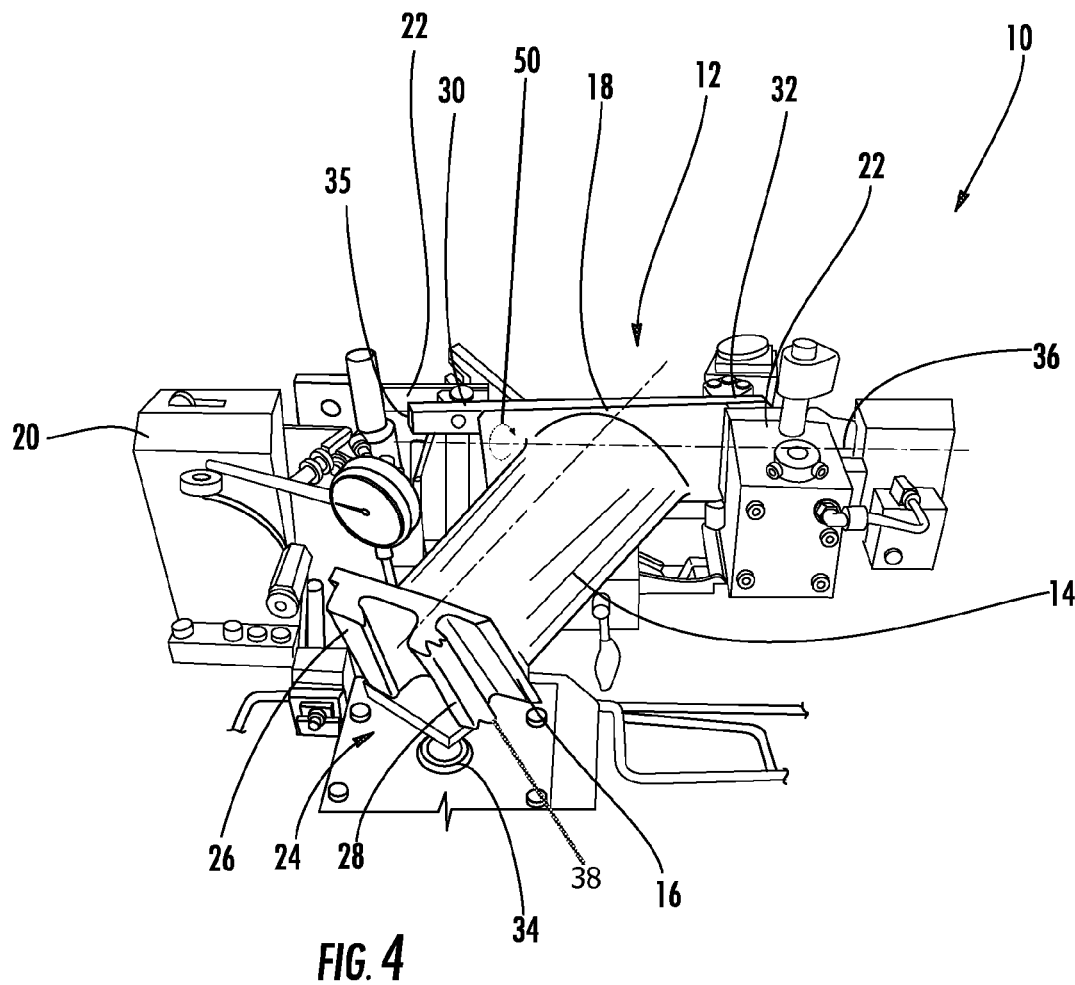
FIG. 4 is a perspective view of a turbine vane positioned in a fixture of the system and fixed at the forward outer hooks of the outer shroud and limited to only rotational movement about a centerline of the turbine vane at the aft outer hooks.

As shown in FIG. 4, a turbine vane 12 may be loaded into a fixture 20. A forward outer hook 30 of the turbine vane may be attached to the fixture 20 via a retention arm 22 to substantially prevent movement of the forward outer hook 30. An aft outer hook 32 of the turbine vane 12 may be coupled to a rotational movement device 36 that restricts the aft outer hook 32 of the turbine vane 12 such that the aft outer hook 32 may only rotate about a centerline 36 of the outer shroud 18. The inner shroud 16 of the turbine vane 12 may be in contact with a force application device 34. A force may be applied to the inner shroud 16 to reconfigure the turbine vane 12. The force may be applied to the turbine vane 12 while the turbine vane 12 is at room temperature. The turbine vane 12 may be in a solution annealed state, such as having undergone about 1200 degrees Celsius for two hours, to achieve the greatest movement and to minimize cracking. An aging heat treatment may also be applied to the turbine vane 12 after applying the force to the turbine vane 12. For instance, the turbine vane 12 may also be subjected to stabilization annealing of temperatures of about 1095 degrees Celsius for about four hours, followed by a first precipitation hardening stage including exposure of the turbine vane 12 to temperatures of about 1080 degrees Celsius, and followed by a second precipitation hardening stage including exposure of the turbine vane 12 to temperatures of about 870 degrees Celsius for about 12 hours. The load application device may be a hydraulic ram rated to about 15,000 pounds.

In another embodiment, as shown in FIG. 4, a turbine vane 12 may be loaded into a fixture 20. An aft outer hook 32 of the turbine vane 12 may be locked with one or more retention arms 22 to substantially prevent movement of the aft outer hook 32 in the direction of arrow 46. A forward outer hook 30 of the turbine vane 12 may be coupled to a rotation limiting device 35 that restricts the forward outer hook 30 of the turbine vane 12 such that the forward outer hook 30 may only rotate about a centerline 36 of the outer shroud 18 in the direction of arrow 50. The inner shroud 16 of the turbine vane 12 may be in contact with the force application device 34. A force may be applied to the inner shroud 16 with the force application device 34. The force may be applied to the turbine vane 12 while the turbine vane 12 is at room temperature. The turbine vane 12 may be in a solution annealed state, such as having undergone about 1200 degrees Celsius for two hours, to achieve the greatest movement and to minimize cracking. An aging heat treatment may also be applied to the turbine vane 12 after applying the force to the turbine vane 12. For instance, the turbine vane 12 may also be subjected to stabilization annealing of temperatures of about 1095 degrees Celsius for about four hours, followed by a first precipitation hardening stage including exposure of the turbine vane 12 to temperatures of about 1080 degrees Celsius, and followed by a second precipitation hardening stage including exposure of the turbine vane 12 to temperatures of about 870 degrees Celsius for about 12 hours. The load application device may be a hydraulic ram rated to about 15,000 pounds.

Figure 5:
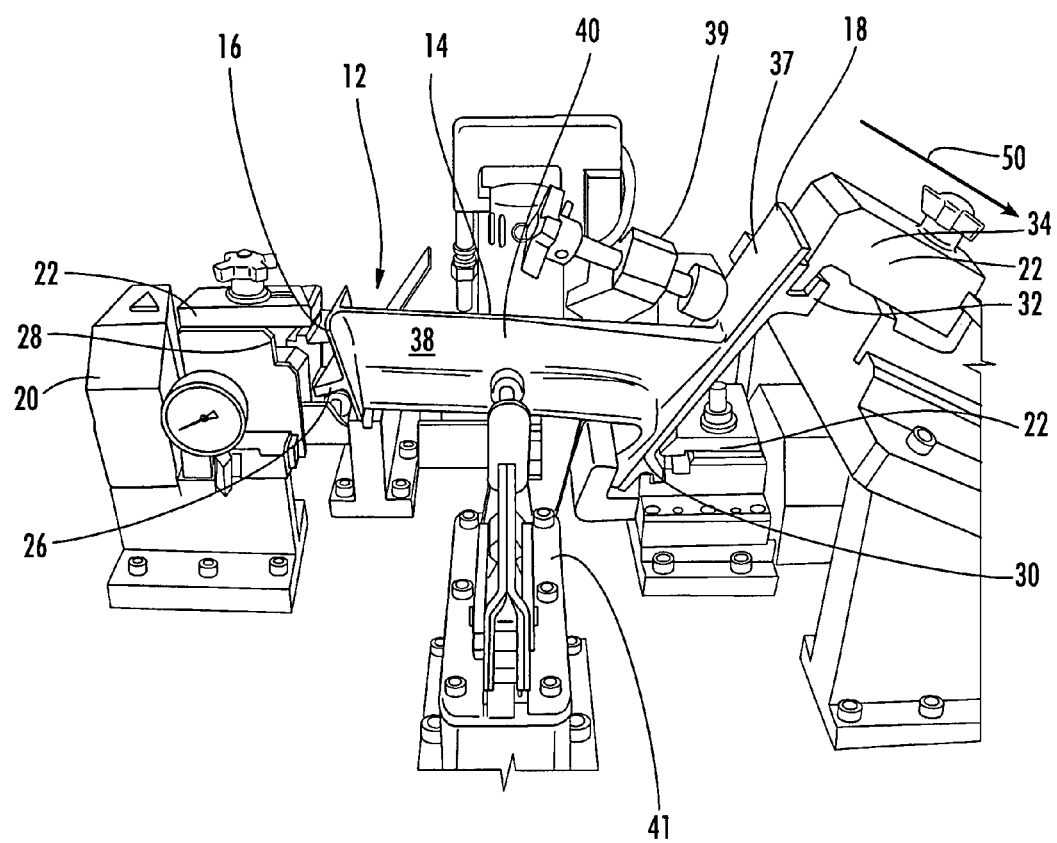
FIG. 5 is a perspective view of a turbine vane positioned in a fixture of the system and fixed at the inner and outer shroud with a force applied to the outer shroud generally aligned with the centerline of the airfoil.

In another embodiment, as shown in FIG. 5, a turbine vane 12 may be loaded into a fixture 20. Forward and aft inner hooks 26, 28 of the inner shroud 16 of the turbine vane 12 may be locked to the fixture 20 to substantially prevent movement of the forward and aft inner hooks 26, 28 of the inner shroud 16. The forward outer hook 30 of the turbine vane may be fixed to prevent rotation or axial movement. The aft outer hook 32 of the turbine vane 12 may be attached to a force application device 34 that may be used to move the aft outer hook 32 toward or away from the inner shroud 16. An outer surface 37 of the outer shroud 18 may be in contact with a damper 39. A second damper 41 may be in contact with a center region 40 of the turbine vane 12 to limit movement. The dampers 39, 41 may be used for safety during the bending process. The force may be applied to the turbine vane while the turbine vane is at room temperature. The force may be applied in this manner to produce bending of the airfoil 14 to correct misalignment of the inner shroud 16 without affecting the fit between the outer shroud hooks 18 and an inspection gage shown in FIG. 3.

The turbine vane 12 may be in a solution annealed state, such as having undergone about 1200 degrees Celsius for two hours, to achieve the greatest movement and to minimize cracking. An aging heat treatment may also be applied to the turbine vane 12 after applying the force to the turbine vane 12. For instance, the turbine vane 12 may also be subjected to stabilization annealing of temperatures of about 1095 degrees Celsius for about four hours, followed by a first precipitation hardening stage including exposure of the turbine vane 12 to temperatures of about 1080 degrees Celsius, and followed by a second precipitation hardening stage including exposure of the turbine vane 12 to temperatures of about 870 degrees Celsius for about 12 hours.

In operation, a turbine vane 12 may be solution annealed, as previously mentioned, before any loads are applied to work the turbine vane 12. The load application portion of the straightening process may be performed before coating and heat treatments are applied to the airfoil 14. A turbine vane 12 that is to be repaired may be slid into an inspection gage as far as the turbine vane 12 will do without force. A master part may be slide into the inspection gage adjacent to the turbine vane 12 to measure the gap 44 between the inner shroud seal gap. The measurement provides a general indication of how much bending is needed at a forward outer hook 30. The turbine vane 12 may be installed in any of the manners previously described. A load may be applied to the turbine vane 12 to correct various problems with the turbine vane 12. The load may be applied by bending the turbine vane 12 in steps with small movements in the same direction to achieve a desired movement. The proper amount of adjustment is determined using a dial indicator and limiting movement of the turbine vane to about 0.7 inch.

In at least one embodiment, the fixture 20 may enable movement at the forward outer hook 30 while allowing rotational movement at the aft outer hook 32. Once the inner shroud gap is acceptable, the aft outer hook 32 may be aligned with the forward outer hook 30. Twist may be removed from the aft outer hooks 32 by fixing the aft outer hooks 32, allowing the forward outer hooks 30 to rotate about the centerline 36 of the inner shroud 16, and applying a force to the pressure side 38 of the inner shroud 16. If the forward or aft inner shroud hooks 26, 28 have an axial misalignment, such as lower than a master part, the misalignment can be corrected using the fixture 20 shown in FIG. 5 and applying a force to the aft outer hook 32 while locking the inner shroud 16 and forward outer hook 30. The turbine vane 12 may then be inserted into an inspection gage and then may be subjected to a crack opening heat treatment and FPI. A bond coat may be applied to the turbine airfoil 12. The turbine vane 12 may also be exposed to a diffusion heat treatment. The turbine vane 12 may be inspected using the inspection gage after undergoing the diffusion heat treatment. A thermal barrier coating (TBC) may be applied to the turbine vane 12. The turbine vane 12 may finally be subjected to a heat treatment of about 870 degrees Celsius. The turbine vane 12 may be finally inspected using an inspection gage.

The foregoing is provided for purposes of illustrating, explaining, and describing embodiments of this invention. Modifications and adaptations to these embodiments will be apparent to those skilled in the art and may be made without departing from the scope or spirit of this invention.

We claim:

1. A method for removing distortions from a turbine vane, comprising:
   loading the turbine vane into a fixture, wherein the turbine vane is formed from an elongated airfoil having an inner shroud attached to a first end and an outer shroud attached to a second end opposite to the first end, wherein the outer shroud includes forward and aft outer hooks extending from the outer shroud away from the elongated airfoil;
   locking the forward outer hook of the turbine vane to the fixture to substantially prevent movement of the forward outer hook;
   restricting the aft outer hook of the turbine vane such that the aft outer hook may only rotate about an outer shroud centerline that is generally aligned with a line extending between a leading edge and trailing edge of the turbine vane; and
   applying a force to the inner shroud.

2. The method of claim 1, wherein the turbine vane is in a solution annealed state.

3. The method of claim 1, applying an aging heat treatment to the turbine vane after applying the force to the turbine vane.

4. A method for removing distortions from a turbine vane comprising:
   loading the turbine vane into a fixture, wherein the turbine vane is formed from an elongated airfoil having an inner shroud attached to a first end and an outer shroud attached to a second end opposite to the first end, wherein the outer shroud includes forward and aft outer hooks extending from the outer shroud away from the elongated airfoil;
   locking the aft outer hook of the turbine vane to the fixture to substantially prevent movement of the aft outer hook;
   restricting the forward outer hook of the turbine vane such that the forward outer hook may only rotate about an outer shroud centerline that is generally aligned with a line extending between a leading edge and trailing edge of the turbine vane; and
   applying a force to the inner shroud.

5. The method of claim 4, wherein the turbine vane is in a solution annealed state.

6. The method of claim 4, applying an aging heat treatment to the turbine vane after applying the force to the turbine vane.

7. A method for removing distortions from a turbine vane comprising:
   loading the turbine vane into a fixture, wherein the turbine vane is formed from an elongated airfoil having an inner shroud attached to a first end and an outer shroud attached to a second end opposite to the first end, wherein the inner shroud includes forward and aft inner hooks extending from the inner shroud away from the elongated airfoil;
   locking the forward and aft inner hooks of the inner shroud of the turbine vane to the fixture to substantially prevent movement of the forward and aft inner hooks of the inner shroud;
   fixing locking a forward outer hook to prevent rotation or axial movement; and
   applying a force to an aft outer hook of the turbine vane to move the aft outer hook away from the inner shroud.

8. The method of claim 7, wherein the turbine vane is in a solution annealed state.

9. The method of claim 7, applying an aging heat treatment to the turbine vane after applying the force to the turbine vane.

* * * * *